US006277909B1

(12) United States Patent
Wilson et al.

(10) Patent No.: US 6,277,909 B1
(45) Date of Patent: *Aug. 21, 2001

(54) FIBER REINFORCED RESINS WITH IMPROVED PHYSICAL PROPERTIES AND PROCESS FOR PRODUCING SAME

(75) Inventors: Bruce Edwin Wilson, Kingsport; Clinton Cherry, deceased, late of Kingsport, both of TN (US), by Cathy D. Cherry, Legal Representative

(73) Assignee: Eastman Chemical Company, Kingsport, TN (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/494,731

(22) Filed: Jan. 31, 2000

Related U.S. Application Data

(62) Division of application No. 09/121,654, filed on Jul. 23, 1998, now Pat. No. 6,051,644.
(60) Provisional application No. 60/061,602, filed on Oct. 10, 1997.

(51) Int. Cl.$^7$ .................................................. C08K 3/00
(52) U.S. Cl. ............................................... 524/494
(58) Field of Search ............................................ 524/494

(56) References Cited

U.S. PATENT DOCUMENTS

| 4,169,933 | 10/1979 | Jackson, Jr. et al. . |
| 4,386,174 | 5/1983 | Cogswell et al. . |
| 4,433,083 | 2/1984 | Cogswell et al. . |
| 5,171,778 | 12/1992 | Dekkers et al. . |

FOREIGN PATENT DOCUMENTS

| 0 030 417 | 6/1981 | (EP) . |
| 0 395 414 | 10/1990 | (EP) . |

OTHER PUBLICATIONS

Derwent Publications Ltd., London, GB; AN 98–053132 (XP002089286) and CN 1 138 604 (Chem Inst CAS) Dec. 25, 1996.
M.M. Coleman et al, *Specific Interactions and the Miscibility of Polymers*, Technomic Publishing Co., Lancaster, PA, Chapter 2, (1991).
F. P. LaMantia, *Thermotropic Liquid Crystalline Blends*, Technomic Publishing Co., (1993), pp. 1–42.
L.E. Nielsen, R.F. Landel, Marcel Dekker, *Mechanical Properties of Polymers and Composites*, "Fiber–Filled Composites and Other Composites", New York, Chapter 8, (1994).

*Primary Examiner*—Edward J. Cain
(74) *Attorney, Agent, or Firm*—Cheryl J. Tubach; Harry J. Gwinnell

(57) ABSTRACT

A process for lessening shear-induced reduction of fiber length in a melt processable, fiber reinforced polymer composition, and compositions useful in and obtained from such process, comprising the steps of: admixing a first polymer, the first polymer being a thermoplastic polymer, with a second polymer being TLCP, and a reinforcing fiber; and subjecting the composition to shear, wherein the first and second polymers have melt processing ranges that overlap over an overlapping melt processing range; and the second polymer is partly immiscible with or immiscible with the first polymer when mixed with the first polymer within the overlapping melt processing range.

14 Claims, No Drawings

FIBER REINFORCED RESINS WITH IMPROVED PHYSICAL PROPERTIES AND PROCESS FOR PRODUCING SAME

CROSS REFERENCE TO RELATED APPLICATIONS

This application is a division of Ser. No. 09/12/654 filed Jul. 23, 1998 now U.S. Pat. No. 6,051,644 which claims priority upon provisional application Ser. No. 60/061,602 filed Oct. 10, 1997, and the No. 60/061,602 application is herein incorporated by this reference in its entirety.

BACKGROUND OF THE INVENTION

FIELD OF THE INVENTION

This invention relates generally to fiber reinforced resins, and to the use of thermotropic liquid crystalline polymers to improve such resins.

Shaped articles that are made from fiber reinforced thermoplastics typically are formed by a process involving one or more stages wherein the thermoplastic is melted and mechanical forces are applied. As one typical example, the thermoplastic is first melted and then conveyed along an extruder, wherein the fiber is added along with other additives such as processing aids, flame retardants, plasticizers and stabilizers. The fiber reinforced thermoplastic obtained from this first extrusion stage is then subjected to a second melt processing stage such as injection molding, wherein the polymer is melted and forced, under pressure, into a mold. A characteristic of such operations is that the fiber reinforced thermoplastic is subjected to shear forces through the conveying and mixing processes at temperatures near or above the melting point of the thermoplastic. These shear forces result in damage to the fiber, including reduction in fiber length, which reduces the mechanical properties of the article that is eventually obtained. It is generally desirable, therefore, to minimize this fiber damage, in order to provide optimum mechanical properties in the final article produced from the thermoplastic.

Various processing techniques, such as adding the glass fiber as late as possible to the process, are known in the art for reducing damage to the fibers. These techniques are not, however, always compatible with either the processing method being employed, or the equipment used to carry out the process.

This invention concerns the use of thermotropic liquid crystalline polymers ("TLCPs") to minimize fiber damage during processing. The use of TLCPs to reduce the viscosity of thermoplastics is well known in the art. The rheology of thermoplastic/TLCP blends is complex, with numerous examples of significant negative deviations from linear mixing rules. Blends of thermoplastics and TLCP, for example, can have viscosities substantially lower than either component individually. TLCPs have even been used to reduce the viscosity of glass fiber reinforced thermoplastics. Cogswell et al. in U.S. Pat. Nos. 4,433,083 and 4,386,174, for example, reported a 5% viscosity reduction in a polysulfone resin when 10 wt. % of a miscible TLCP was added and sheared at 1000 $s^{-1}$.

In the present invention TLCPs are added to fiber reinforced thermoplastics before the thermoplastics are processed in order to minimize the fiber damage that occurs during the processing. In contrast to Cogswell, a TLCP and thermoplastic are chosen that are at least partly immiscible. The addition of TLCP to the thermoplastic before processing minimizes the amount of fiber damage to the fiber reinforced thermoplastic during processing, when compared to the fiber damage that occurs when the fiber reinforced thermoplastic is processed without TLCP. In many instances, the addition of TLCP even increases the viscosity of the fiber reinforced thermoplastic, in further contrast to the teachings of Cogswell.

SUMMARY OF THE INVENTION

In accordance with the purpose(s) of this invention, as embodied and broadly described herein, this invention, in one aspect, relates to a melt processable, fiber reinforced polymer composition comprising: a first polymer, the first polymer being a thermoplastic polymer; a second polymer, the second polymer being a TLCP; and a reinforcing fiber; wherein: the first and second polymers have an overlapping melt processing range; and the second polymer is partly immiscible with or is immiscible with the first polymer when mixed with the first polymer within the overlapping melt processing range.

In another aspect the invention relates to a process for lessening shear-induced reduction of fiber length in a melt processable, fiber reinforced polymer composition comprising the steps of: admixing a first polymer, the first polymer being a thermoplastic polymer, with a second polymer being a TLCP, and a reinforcing fiber; and subjecting the composition to shear, wherein the first and second polymers have melt processing ranges that overlap over an overlapping melt processing range; and the second polymer is partly immiscible with or immiscible with the first polymer when mixed with the first polymer within the overlapping melt processing range.

In yet another embodiment the invention relates to a melt processable, fiber reinforced polymer composition comprising: a first polymer, the first polymer being a thermoplastic polymer; a second polymer, the second polymer being a TLCP, and a reinforcing fiber; wherein: the first and second polymers have an overlapping melt processing range; and wherein the second polymer and first polymer are present in the composition at a weight ratio of second polymer to first polymer of less than 1:10.

In still another aspect the invention relates to a process for lessening shear-induced reduction of fiber length in a melt processable, fiber reinforced polymer composition comprising the steps of: admixing a first polymer, the first polymer being a thermoplastic polymer, with a second polymer, the second polymer being a TLCP, and a reinforcing fiber; and subjecting the composition to shear, wherein: the first and second polymers have melt processing ranges that overlap over an overlapping melt processing range; and the composition is subjected to over 1000 $s^{-1}$ units of shear.

Additional aspects and advantages of the invention will be set forth in part in the description that follows, and in part will be obvious from the description, or may be learned by practice of the invention. The advantages of the invention will be realized and attained by means of the elements and combinations particularly pointed out in the appended claims. It is to be understood that both the foregoing general description and the following detailed description are exemplary and explanatory only and are not restrictive of the invention, as claimed.

DESCRIPTION OF THE INVENTION

The present invention may be understood more readily by reference to the following detailed description of the invention and to the examples included herein. Before the present compounds, compositions and methods are disclosed and described, however, it is to be understood that this invention is not limited to specific methods, or to particular compositions or processing regimens, as such may, of course, vary. It is also to be understood that the terminology used herein is for the purpose of describing particular embodiments only and is not intended to be limiting.

It must be noted that, as used in the specification and the appended claims, the singular forms "a," "an" and "the" include plural referents unless the context clearly dictates otherwise. Thus, for example, reference to "an aromatic compound" includes mixtures of aromatic compounds, reference to "a polyester" includes mixtures of two or more such polyesters, and the like.

References in the specification and concluding claims to parts by weight, of a particular element or component in a composition or article, denote the weight relationship between the element or component and any other elements or components in the composition or article for which a part by weight is expressed. Thus, in a compound containing 2 parts by weight of component X and 5 parts by weight component Y, X and Y are present at a weight ratio of 2:5, and are present in such ratio regardless of whether additional components are contained in the compound.

Ranges are often expressed herein as from about one particular value, and/or to about another particular value. When such a range is expressed, it is to be understood that a more preferred range is typically from the one particular value and/or to the other particular value. Similarly, when values are expressed as approximations, by use of the antecedent "about," it will be understood that the particular value is typically more preferred.

In this specification and in the claims which follow, reference will be made to a number of terms that shall be defined to have the following meanings:

A residue of a chemical species, as used in the specification and concluding claims, refers to the moiety that is the reaction product of the chemical species in a particular reaction scheme or subsequent formulation or chemical product, regardless of whether the moiety is actually obtained from the chemical species. Thus, an ethylene glycol residue in a polyester refers to one or more —OCH$_2$CH$_2$O— units in the polyester, regardless of whether ethylene glycol was used to prepare the polyester. Similarly, a sebacic acid residue in a polyester refers to one or more —CO(CH$_2$)$_8$CO— moieties in the polyester, regardless of whether the residue is obtained by reacting sebacic acid or an ester thereof to obtain the polyester.

The term "melt processing range" as used herein refers to the temperature range between which the polymer begins to flow and where the thermal degradation results in unacceptable loss of properties.

"Optional" or "optionally" means that the subsequently described event or circumstance may or may not occur, and that the description includes instances where said event or circumstance occurs and instances where it does not. For example, the phrase "optionally substituted lower alkyl" means that the lower alkyl group may or may not be substituted and that the description includes both unsubstituted lower alkyl and lower alkyl where there is substitution.

By the term "effective amount" of a compound or property as provided herein is meant such amount as is capable of performing the function of the compound or property for which an effective amount is expressed. As will be pointed out below, the exact amount required will vary from process to process, depending on recognized variables such as the compounds employed and the processing conditions observed. Thus, it is not possible to specify an exact "effective amount." However, an appropriate effective amount may be determined by one of ordinary skill in the art using only routine experimentation.

The terms "polymer" and "resin" are used interchangeably herein, and each term is meant to include any of various substances made by chemical synthesis, especially those used in the making of plastics, any compound formed by polymerization, and any of two or more polymeric compounds.

The term "modified" is often used herein to describe polymers and means that a particular monomeric unit that would typically make up the pure polymer has been replaced by another monomeric unit that shares a common polymerization capacity with the replaced monomeric unit. Thus, for example, it is possible to substitute diol residues for glycol in poly(ethylene glycol), in which case the poly(ethylene glycol) will be "modified" with the diol. If the poly(ethylene glycol) is modified with a mole percentage of the diol, then such a mole percentage is based upon the total number of moles of glycol that would be present in the pure polymer but for the modification. Thus, in a poly(ethylene glycol) that has been modified by 50 mole % with a diol, the diol and glycol residues are present in equimolar amounts.

"TLCP" is the abbreviated term for "thermotropic liquid crystalline polymer", as distinct from lytropic liquid crystalline polymer. Liquid crystalline polymers are well known in the art and are characterized by being capable of maintaining a high degree of intermolecular order in a liquid state, even in the absence of anisotropic shear forces, and by exhibiting a behavior pattern characteristic of a crystalline liquid. Thermotropic LCP's such as Vectra®, give rise to this ordered system in the molten state, while lyotropic LCP's such as Kevlar®, give rise to this ordered system in solution. These ordered systems may generally be classified as nematic, smectic, or cholesteric, and all of these classes of TLCP are included in this invention. TLCPs are reviewed, for example, in F. P. LaMantia, *Thermotropic Liquid Crystalline Blends*, Technomic Publishing Co. (1993). The disclosure of this publication is hereby incorporated by reference as if fully set forth herein.

"PET-HB" is the abbreviated term for poly(ethylene terephthalate-co-p-hydroxybenzoate), meaning a copolymer of p-hydroxybenzoyl and oxyethyleneoxyterephthaloyl residues. Such polymers may be prepared by modifying poly (ethylene terephthalate) to contain the p-hydroxybenzoate residues. A numeric designation, such as the 80 in PET-80HB, refers to the molar percentage of p-hydroxybenzoate residues in the copolymer.

"HB-NA" is the abbreviated term for poly (hydroxybenzoic acid-co-2-hydroxy-6-naphthoic acid).

The term "polyester" includes copolyesters.

When referenced herein, inherent viscosity of TLCPs is measured at 25 C. using 0.5 wt. % polymer in pentafluorophenol. The inherent viscosity of polyesters is measured using 0.5 wt. % polyester in 60/40 phenol/tetrachloroethane at 25 C.

The invention provides a melt processable, fiber reinforced polymer composition comprising: a first polymer, the first polymer being a thermoplastic polymer; a second polymer, the second polymer being a TLCP; and a reinforcing fiber; wherein: the first and second polymers have an overlapping melt processing range; and the second polymer is partly immiscible with or is immiscible with the first polymer when mixed with the first polymer within the overlapping melt processing range. In another embodiment the invention provides a melt processable, fiber reinforced polymer composition comprising: a first polymer, the first polymer being a thermoplastic polymer; a second polymer, the second polymer being a TLCP, and a reinforcing fiber; wherein: the first and second polymers have an overlapping melt processing range; and wherein the second polymer and first polymer are present in the composition at a weight ratio of second polymer to first polymer of less than 1:10.

The invention further provides a process for lessening shear-induced reduction of fiber length in a melt processable, fiber reinforced polymer composition comprising the steps of: admixing a first polymer, the first polymer being a thermoplastic polymer, with a second polymer being a TLCP, and a reinforcing fiber; and subjecting the composition to shear; wherein the first and second polymers have melt processing ranges that overlap over an overlapping melt processing range; and the second polymer is partly immiscible with or immiscible with the first polymer when mixed with the first polymer within the overlapping melt processing range. In still another aspect the invention relates to a process for lessening shear-induced reduction of fiber length in a melt processable, fiber reinforced polymer composition comprising the steps of: admixing a first polymer, the first polymer being a thermoplastic polymer, with a second polymer, the second polymer being a TLCP, and a reinforcing fiber; and subjecting the composition to shear, wherein: the first and second polymers have melt processing ranges that overlap over an overlapping melt processing range; and the composition is subjected to over 1000 $s^{-1}$ units of shear. Because the process lessens the reduction in fiber length, compositions obtained by the process often have improved physical properties such as modulus and elongation to break when compared with compositions not produced by the process.

The invention is particularly suitable for application to processes wherein the shear that induces reduction in fiber length is applied by extrusion. The process has further particular application to processes in which the composition is subjected to over about 250 $s^{-1}$ units of shear. The invention may preferably be employed in processes in which the composition is subjected to over about 1000 $s^{-1}$ units of shear, even more preferably to processes in which the composition is subjected to over about 1500 $s^{-1}$ units of shear, and still even more preferably to processes in which the composition is subjected to over about 2500 $s^{-1}$ units of shear. A preferred range in which to practice the invention is from about 500 to about 25,000 $s^{-1}$ units of shear, and an even more preferred range is from about 3,000 to about 9,000 $s^{-1}$ units of shear; and a still even more preferred range is from about 4,000 to about 10,000 $s^{-1}$ units of shear In one embodiment of the invention the fiber is admixed with the first polymer before the second polymer is added. In another embodiment the second polymer is admixed with the fiber before the first polymer is added. In a preferred embodiment the second polymer is admixed with the first polymer before the fiber is added.

A particular advantage from the process of the present invention is the reduction in shear-induced damage to fibers in fiber reinforced thermoplastic polymers. In the process of the current invention, the resulting fiber lengths are preferably at least 10% longer (based on the mean of the length distribution) when compared to processes that do not use the TLCP, and are more preferably at least 25% longer than non-TLCP using processes.

The first and second polymers preferably should be chosen so that they are immiscible or partly immiscible in an effective amount to reduce the shear induced reduction in fiber length that otherwise would occur during processing of the first polymer in the absence of the TLCP. The polymers are compatible, and may be used in the compositions of the present invention, if they evidence any effective amount of immiscibility. The miscibility and potential compatibility of polymers is discussed in M. M. Coleman et al., *Specific Interactions and the Miscibility of Polymers*, Technomic Publishing, Lancaster, Pa., Chapter 2 (1991), the disclosure of which is hereby incorporated by this reference.

The effective amount of miscibility of the polymers can, in many instances, be expressed numerically by measuring or identifying the difference between the solubility parameters for the polymers. Polymers that have solubility parameters that differ by about 0.3 $(J/cm^3)^{0.5}$ and greater are generally immiscible, and are particularly suitable for practicing the present invention. In another embodiment the difference in solubility parameters of the first polymer and second polymer is greater than about 0.5 $(J/cm^3)^{0.5}$, in a further embodiment the difference in solubility parameters of the first polymer and second polymer is greater than about 0.7 $(J/cm^3)^{0.5}$, in a still further embodiment the difference in solubility parameters of the first polymer and second polymer is greater than about 1.0 $(J/cm^3)^{0.5}$, in yet another embodiment the difference in solubility parameters of the first polymer and second polymer is greater than about 1.3 $(J/cm^3)^{0.5}$, and in still another embodiment the difference in solubility parameters of the first polymer and second polymer is greater than about 1.6 $(J/cm^3)^{0.5}$.

The composition of the present invention may comprise the first and second polymers at any ratio, although it is generally preferred that the first and second polymers be present in the composition in effective amounts to reduce the shear induced reduction in fiber length that otherwise would occur during processing of the first polymer in the absence of the TLCP. The polymers should also be present in an effective amount to prevent brittle failure problems in the final product due to the immiscibility of the polymers. The first and second polymers may preferably be present in effective amounts in which the weight ratio of second polymer to first polymer is less than 1:1 0, and greater than 1:49. Even more preferably, the weight ratio of second polymer to first polymer is from about 1:14 to about 1:25, and most preferably the ratio is about 1:19.

Preferred compositions comprise from about 20 to about 94.5 percent by weight of the first polymer, from about 0.5 to about 30 percent by weight of the second polymer, and from about 5 to about 70 percent by weight of the fiber. Even more preferred compositions comprise from about 45 to about 78 percent by weight of the first polymer, from about 2 to about 10 percent by weight of the second polymer, and from about 20 to about 45 percent by weight of the fiber. Still even more preferred compositions comprise from about 59 to about 72 percent by weight of the first polymer, from about 3 to about 6 percent by weight of the second polymer, and from about 20 to about 35 percent by weight of the fiber.

In order to obtain a suitable melt processable composition for the present invention, and in order to carry out the process of the invention, it is necessary that the first and second polymers be melt processable, and that the melt processing range for each of the first and second polymers overlap. Preferably the melt processing ranges overlap by at least 5 C., more preferably the ranges overlap by at least 10 C., more preferably at least 20 C., and most preferably the ranges overlap by from about 20 C. to about 30 C. In order to optimize the overlap of the melt processing temperature ranges of the first and second polymers, preferred thermoplastics for the first polymer of this invention have a melting point from about 200 C. to about 400 C., and more preferably from about 250 C. to about 350 C. Preferred TLCPs similarly have a melting point of from about 200 C. to about 400 C., and more preferably from about 250 C. to about 350 C. Various means are known in the art for modifying the melting point of a TLCP to increase the overlap of its melt processing range with the melt processing range of the first polymer. For example, the melting point of a TLCP may be lowered by adding side groups (e.g., replacing hydroquinone with phenylhydroquinone), reducing the aromatic content (e.g., replacing hydroquinone with ethylene glycol), or adding bends into the rigid sections (e.g., replacing hydroquinone with resorcinol).

In preferred compositions the first polymer is a crystalline or semi-crystalline polymer that is capable of crystallizing at least 10% by weight under thermoforming conditions, i.e. at a temperature of less than the polymer's melting point. A preferred first polymer, when present as a ¼ inch rod, is capable of crystallizing at least 10% by weight in a period of 20 seconds or less. A more preferred polymer is capable of reaching 10% crystallinity in less than 10 seconds. In another embodiment the first polymer is a crystalline or semi-crystalline polymer that is capable of crystallizing at least 20% by weight under thermoforming conditions. Preferably the second polymer reaches 20% crystallinity in less than 20 seconds, a more preferred polymer reaches 20% crystallinity in less than 10 seconds, and an even further preferred polymer reaches 20% crystallinity in less than 5 seconds. Nucleators, plasticizers, and other crystallization promoters may be added to the first polymer to bring its crystallization behavior into the preferred range.

Suitable polymers for the first polymer, and suitable fibers used to reinforce such polymers, are well-known in the art, as discussed in, for example, L. E. Nielsen and R. F. Landel, *Mechanical Properties of Polymers and Composites*, Marcel Dekker: New York, Chapter 8 (1994), the disclosure from which is hereby incorporated by reference as if fully set forth herein. Suitable polymers for the first polymer are thermoplastic, meaning they become fluid with increases in temperature, and therefore are melt processable. Particularly suitable thermoplastics for the first polymer include polyolefins, polyacrylates, polyesters, polyamides, polyarylates, and polyimides. In a particularly suitable embodiment the first polymer is a polyester or copolyester comprising dicarboxylic acid and diol residues. In a preferred embodiment the first polymer comprises poly (ethylene terephthalate), poly(tetramethylene terephthalate), poly(cyclohexane-1,4-methylene terephthalate), poly (ethylene naphthyl-2,6-dicarboxylate), poly(tetramethylene naphthyl-2,6-dicarboxylate), poly(cyclohexane-1,4-methylene naphthyl-2,6-dicarboxylate), poly(caprolactam), poly(hexamethylene adipamide), poly(tetramethylene adipamide), poly(p-phenylene sulfide), and/or poly(p-phenylene oxide).

Any TLCP that is immiscible or partly immiscible with the first polymer generally is suitable in the compositions of the present invention. Particularly suitable TLCPs for the second polymer, however, comprise residues of ethylene glycol, terephthalic acid, naphthalene-2,6-dicarboxylic acid, naphthalene-6-carboxyl-2-ol, hydroquinone, p-hydroxybenzoic acid, methylhydroquinone, phenylhydroquinone, naphthalene-6-carboxyl-2-amide, p-aminobenzoic acid, and/or isophthalic acid.

Preferred TLCPs are poly(ethylene terephthalate-co-p-hydroxybenzoate)copolyesters (PET-HB), poly (hydroxybenzoic acid-co-2-hydroxy-6-naphthoic acid) copolyesters (HB-NA), and aromatic polymers formed from terephthalic acid, naphthalene-2,6-dicarboxylic acid, hydroquinone, and/or p-hydroxybenzoic acid, PET-HB derivatives, and HB-NA derivatives. Preferred derivatives include PET-HB and HB-NA that are modified to contain residues of ethylene glycol, terephthalic acid, naphthalene-2,6-dicarboxylic acid, naphthalene-6-carboxyl-2-ol, hydroquinone, p-hydroxybenzoic acid, methylhydroquinone, phenylhydroquinone, naphthalene-6-carboxyl-2-amide, p-aminobenzoic acid, trans-stilbene-4,4' dicarboxylic acid, and/or isophthalic acid. In another embodiment preferred TLCPs are disclosed in Jackson et al., U.S. Pat. No. 4,169,933, the disclosure from which is hereby incorporated by this reference as if specifically set forth herein.

Preferred PET-HB TLCPs comprise from about 60 to about 90 mole percent p-hydroxybenzoic acid residues, wherein the mole percentage is based upon the total number of moles of hydroxyethyleneoxyterephthaloyl residues and hydroxybenzoyl residues in the TLCP. Even more preferred PET-HB TLCPs comprise from about 75 to about 85 mole percent p-hydroxybenzoic acid residues, and still even further preferred PET-HB TLCPs comprise from about 78 to about 82 mole percent p-hydroxybenzoic acid residues. Preferred HB-NA TLCPs comprise from about 5 to about 95 mole percent p-hydroxybenzoic acid residues, and more preferred HB-NA TLCPs comprise from about 40 to about 60 mole percent p-hydroxybenzoic acid residues. Other dibasic acids, glycols, and/or hydroxyacids may be used in addition to, or instead of monomers for the preparation of the above TLCPs, in order to prepare a TLCP with a melt processing range which overlaps that of the thermoplastic polymer.

The inherent viscosity of the TLCP is a further processing consideration in the selection of preferred second polymers. A preferred second polymer is PET-HB having an inherent viscosity of from about 0.3 to about 10.0 dl/g. An even more preferred second polymer is PET-HB having an inherent viscosity of from about 0.5 to about 3.5 dl/g. The inherent viscosities of the TLCP are measured at 25° C. at 0.5% by weight polymer in pentafluorophenol.

Whether a first and second polymer are suitable for practicing the present invention can also be evaluated by comparison of certain properties exhibited by the polymers in combination and alone. In one embodiment, for example, the first polymer, fiber, and second polymer are chosen in amounts so that the length of fibers in a composition A, consisting of the first polymer and the fiber at a weight ratio R of weight of first polymer to weight of fiber, after melt processing, is less than the length of fibers in a composition B, after melt processing, that consists of the second polymer, the first polymer and the fiber, wherein the first polymer and the fiber are also present in composition B at the weight ratio R. In a separate embodiment, the first polymer, fiber, and second polymer are chosen in amounts so that the viscosity of a composition A consisting of the first polymer and the fiber at a weight ratio R of weight of first polymer to weight of fiber, is less than the viscosity of a composition B that consists of the second polymer and the first polymer and the fiber, wherein the first polymer and the fiber are present in composition B at the weight ratio R. In a preferred separate embodiment, the melt viscosity of the first polymer/TLCP/fiber mixture, measured at $1000\,s^{-1}$ or higher, is 5% or more higher than the melt viscosity of the first polymer and fiber without the TLCP. In an even further embodiment, the first and second polymers meet both of the foregoing criteria, so that the viscosity of the thermoplastic polymer is increased and the glass fiber length reduction is lessened.

This invention can be practiced with any fibrous material which retains its fibrous characteristics under the polymer melt processing conditions. The use of chopped fibrous materials as reinforcing agents in polymer resins is well known in the art. Suitable fibers are set forth, for example, in L. E. Nielson and R. F. Landel, *Mechanical Properties of Polymers and Composites*, Marcel Dekker: New York, Chapter 8 (1994), previously incorporated by reference. Preferred embodiments of this invention include glass fibers, carbon fibers, and fibers prepared from other liquid crystalline polymers. The surface of these fibers may be treated with various agents and/or processes to improve the interaction and adhesion with the polymer matrix, as is well-known in the art and in common commercial practice. A particularly preferred embodiment of this invention uses any of the general class of coated, chopped glass fibers, with initial lengths between 0.125" and 2" and diameters from 5 to 45 microns, and even more preferably from 8 to 20 microns (e.g. Owens-Coming OC492AA chopped glass fiber).

The compositions of this invention may optionally comprise one or more additives which lend to the composition desirable qualities. Such additives include, for example, flame retardants, nucleators, antioxidants, stabilizers, colorants, dyes, pigments, plasticizers, non-fibrous fillers, non-fibrous reinforcing agents, and processing aids. In a particularly suitable embodiment, the composition comprises from about 0.1 percent to about 60 percent by weight of the one or more additives.

Beneficial results are obtained using either pellet blends or melt blends of the TLCP and of the thermoplastic polyesters. The melt blends may be made in any conventional melt blending apparatus such as single or twin screw extruders, Brabender plastographs, and the like. Beneficial results are also obtained when the TLCP is used as one component in a polymeric formulation. In one embodiment, for example, one or more other polymers are blended with the TLCP prior to blending with the thermoplastic.

The compositions of the present invention can be used during the manufacture of various products, and can also be incorporated into many final products. Thus, the compositions can be raw materials that are further processed before a final product is prepared, and the compositions can also be present as the final article. The composition can, for example, be incorporated into shaped articles, including extruded shaped articles and molded shaped articles.

The compounds and components of the invention may be readily synthesized and prepared using techniques generally known to synthetic organic or polymer chemists. Suitable experimental methods for making and deriving the first and second polymers are described, for example, in the references cited in this document, the disclosures of which being hereby incorporated by this reference for their general teachings and for their synthesis teachings. Methods for making specific and preferred compositions of the present invention are described in detail in examples set forth below.

EXAMPLES

The following examples are put forth so as to provide those of ordinary skill in the art with a complete disclosure and description of how the compounds claimed herein are made and evaluated, and are intended to be purely exemplary of the invention and are not intended to limit the scope of what the inventors regard as their invention. Efforts have been made to ensure accuracy with respect to numbers (e.g., amounts, temperature, etc.) but some errors and deviations should be accounted for. Unless indicated otherwise, parts are parts by weight, temperature is in C. or is at room temperature, and pressure is at or near atmospheric.

Average glass fiber lengths were determined by optical microscopy. A sample of the polymer was ashed, and the ash residue suspended in oil. At least 1000 fibers in each sample were identified and their lengths measured using a digitization and analysis computer program. Values quoted herein are the length weighted mean of the distribution. Based on sampling statistics, the relative uncertainty in this number is about 5%.

Viscosities were measured at 305 C. (PCT) and 280 C. (PET) using a 1/d=40, 180 deg. entrance angle capillary rheometer, at 1000 $s^{-1}$.

Mechanical properties were tested using ASTM D638-I (Tensile properties), ASTM D790A-1 (Flexural properties) and ASTM D256A (Izod impact properties). Tensile properties were determined without an extensometer and are the average of two samples. Flexural properties are the average of five samples, as are Izod impact properties.

Example 1

A) 700 grams of poly(cyclohexane-1,4-methylene terephthalate) (PCT) pellets were mixed with 300 grams of chopped glass fiber. This blend was compounded using a Brabender D6 (0.75") twin screw extruder at 300 C., 50 rpm screw speed, and about 1000 g/hour throughput. The system was allowed to equilibrate for 30 minutes, and then the material was collected (Sample 1A).

B) 650 grams of PCT pellets were mixed with 50 grams of poly(ethylene terephthalate-co-p-hydroxybenzoate 20:80) (PET-80HB) pellets and 300 grams of chopped glass fiber. This blend was compounded and sampled as above (Sample 1B).

C) 650 grams of PCT pellets were mixed with 50 grains of ground poly(p-phenylene chloroterephthalate)-co-(p-phenylene naphthyl-2,6-dicarboxylate)-co-(p-hydroxybenzoate) 10:30:60) and 300 grams of chopped glass fiber. This blend was compounded and sampled as above (Sample 1C).

Glass fiber lengths of these three samples are given in Table 1. Both TLCPs result in substantially longer glass fibers than for the PCT without TLCP and that the TLCPs do not result in viscosity reductions.

TABLE 1

| Property | Sample 1A | Sample 1B | Sample 1C |
|---|---|---|---|
| Glass fiber length (microns) | 430 | 643 | 627 |
| Viscosity (305 C, 1000 $s^{-1}$, Pa-s) | 188 | 209 | 203 |

Example 2

A) 700 grams of poly(ethylene terephthalate) (PET) pellets were mixed with 300 grams of chopped glass fiber. This blend was compounded using Brabender D6 (0.75") twin screw extruder at 300 C., 50 rpm screw speed, and about 1000 g/hour throughput. The system was allowed to equilibrate for 30 minutes, and then the material was collected (Sample 2A).

B) 650 grams of PET pellets were mixed with 50 grams of PET-80HB pellets and 300 grams of chopped glass fiber. This blend was compounded and sampled as above (Sample 2B).

Glass fiber lengths for these two samples are given in Table 2. The presence of the TLCP resulted in substantially longer glass fibers and does not result in a reduced viscosity.

TABLE 2

| Property | Sample 2A | Sample 2B |
|---|---|---|
| Glass Fiber length (microns) | 446 | 628 |
| Viscosity (305 C, 1000 s$^{-1}$, Pa-s) | 297 | 321 |

Example 3

A) 700 grams of poly(ethylene terephthalate) (PET) pellets were mixed with 300 grams of chopped glass fiber. This blend was compounded using a Brabender D6 (0.75") twin screw extruder at 300 C., 50 rpm screw speed, and about 1000 g/hour throughput. The system was allowed to equilibrate for 30 minutes, and then the material was collected (Sample 3A).

B) 650 grams of PET pellets were mixed with 50 grams of HB-NA copolymer (Vectra A950) pellets and 300 grams of chopped glass fiber.

This blend was compounded and sampled as above (Sample 3B).

Glass fiber lengths for these two samples are given in Table 3. The presence of the TLCP results in substantially longer glass fibers and does not result in a reduced viscosity.

TABLE 3

| Property | Sample 3A | Sample 3B |
|---|---|---|
| Glass Fiber length (microns) | 422 | 605 |
| Viscosity (305 C, 1000 s$^{-1}$, Pa-s) | 277 | 301 |

Example 4

A) 9.333 kg/hr of PCT pellets and 0.093 kg/hr of an ionomeric nucleator were fed into the feed hopper of a 30 mm twin screw extruder. 4 kg/hr of chopped glass fiber was fed into the extruder about two thirds of the way down the barrel. The system was allowed to stabilize for 20 minutes, and material collected (Sample 4A–C). This sample was subsequently injection molded into test specimens using a Boy 50s injection molder at 300° C., with a 42 second cycle time and a 160 C. mold (Sample 4A–M).

B) 8.667 kg/hr of PCT pellets, 0.093 kg/hr of an ionomeric nucleator, and 0.667 kg/hr of PET-80HB pellets were fed into the feed hopper of the above extruder, and 4 kg/hr of chopped glass fiber was added as above (Sample 4B–C). This material was sampled and molded as above (Sample 4B–M).

The glass fiber lengths and viscosities of the compounded samples are given in Table 4. The fiber lengths and mechanical properties of the molded samples are given in Table 5. For the compounded samples, the presence of the TLCP results in increased fiber lengths and viscosities. In the molded samples, the properties of the TLCP-containing sample are significantly better than the sample without TLCP.

TABLE 4

| Property | Sample 4A-C | Sample 4B-C |
|---|---|---|
| Glass Fiber length (microns) | 664 | 816 |
| Viscosity (305 C, 1000 s$^{-1}$, Pa-s) | 220 | 268 |

TABLE 5

| Property | Sample 4A-M | Sample 4B-M |
|---|---|---|
| Glass Fiber length (microns) | 342 | 430 |
| Tensile Break Stress (Mpa) | 111 | 130 |
| Tensile Break Strain (%) | 3.8 | 4.5 |
| Flexural Modulus (Mpa) | 6530 | 7660 |
| Flexural Deflection to Break (%) | 2.1 | 3.0 |
| Izod Impact, notched (23 C, J/m) | 96 | 112 |
| Izod Impact, unnotched (23 C, J/m) | 864 | 938 |

Throughout this application, various publications are referenced. The disclosures of these publications in their entireties are hereby incorporated by reference into this application in order to more fully describe the state of the art to which this invention pertains.

It will be apparent to those skilled in the art that various modifications and variations can be made in the present invention without departing from the scope or spirit of the invention. Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A melt processable, fiber reinforced polymer composition comprising:
   (a) a first polymer;
   (b) a second polymer, the second polymer being a TLCP; and
   (c) a reinforcing fiber; wherein
      (i) the first and second polymers have an overlapping melt processing range; and
      (ii) the second polymer is partly immiscible with or is immiscible with the first polymer when mixed with the first polymer within the overlapping melt processing range; wherein
      (iii) a composition A consists of the first polymer and the fiber at a weight ratio R of weight of first polymer to weight of fiber and a composition B consists of the second polymer, the first polymer and the fiber wherein the first polymer and the fiber are present in composition B at a weight ratio R of first polymer to weight of fiber; and wherein
      (iv) the length of the fiber in composition B after melt processing is about 10% or more greater than the length of fibers in composition A after melt processing.

2. The composition of claim 1 wherein the first polymer is a polyester or copolyester.

3. The composition of claim 1 wherein the first polymer, fiber, and second polymer are chosen so that the viscosity of composition A is less than the viscosity of composition B.

4. The composition of claim 1, wherein the first polymer comprises one or more of: poly(ethylene terephthalate), poly(tetramethylene terephthalate), poly(cyclohexane-1,4-methylene terephthalate), poly(ethylene naphthyl-2,6-dicarboxylate), poly(tetramethylene naphthyl-2,6- dicarboxylate), poly(cyclohexane-1,4-methylene naphthyl-2,6-dicarboxylate), poly(caprolactam), poly(hexamethylene adipamide), poly(tetramethylene adipamide), poly(p-phenylene sulfide), or poly(p-phenylene oxide).

5. The composition of claim 1, wherein the reinforcing fiber comprises one or more of: glass fibers, carbon fibers or fibers prepared from liquid crystalline polymers.

6. The composition of claim 1, wherein the length of the fiber in composition B is about 25% or more greater than the length of the fiber in composition A.

7. The composition of claim 1, wherein the first polymer comprises one or more of: a polyolefin, a polyacrylate, a polyester, a copolyester, a polyamide, a polyacrylate, or a polyimide.

8. A process for lessening shear-induced reduction of fiber length in a melt processable, fiber reinforced polymer composition comprising the steps of:
  (a) admixing a first polymer with a second polymer and a reinforcing fiber; and
  (b) subjecting the composition to shear, wherein
    (i) the first and second polymers have melt processing ranges that overlap over an overlapping melt processing range; and
    (ii) the second polymer is partly immiscible with or immiscible with the first polymer when mixed with the first polymer within the overlapping melt processing range; wherein
    (iii) a composition A consists of the first polymer and the fiber at a weight ratio R of weight of first polymer to weight of fiber and a composition B consists of the second polymer, the first polymer and the fiber, wherein the first polymer and the fiber are present in composition B at a weight ratio R of first polymer to weight of fiber; and wherein
    (iv) the length of the fiber in composition B after melt processing is about 10% or more greater than the length of fibers in composition A after melt processing.

9. The method of claim 8, wherein the first polymer comprises one or more of poly(ethylene terephthalate), poly(tetramethylene terephthalate), poly(cyclohexane-1,4-methylene terephthalate), poly(ethylene naphthyl-2,6-dicarboxylate), poly(tetramethylene naphthyl-2,6-dicarboxylate), poly(cyclohexane-1,4-methylene naphthyl-2,6-dicarboxylate), poly(caprolactam), poly(hexamethylene adipamide), poly(tetramethylene adipamide), poly(p-phenylene sulfide), and/or poly(p-phenylene oxide).

10. The method of claim 8, wherein the reinforcing fiber comprises one or more of: glass fibers, carbon fibers or fibers prepared from liquid crystalline polymers.

11. The process of claim 8 wherein the length of fibers in composition B is about 25% or more greater than the length of the fiber in composition A.

12. The process of claim 8, wherein the first polymer comprises one or more of: a polyolefin, a polyacrylate, a polyester, a copolyester, a polyamide, a polyacrylate, or a polyimide.

13. The process of claim 8, wherein the first polymer is a polyester or copolyester.

14. The composition of claim 8 wherein the first polymer, fiber, and second polymer are chosen so that the viscosity of composition A is less than the viscosity of composition B.

* * * * *